(12) United States Patent
DeMoney

(10) Patent No.: US 6,496,899 B1
(45) Date of Patent: Dec. 17, 2002

(54) DISK SCHEDULING SYSTEM WITH BOUNDED REQUEST REORDERING

(75) Inventor: Michael A. DeMoney, Los Gatos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/514,485

(22) Filed: Feb. 28, 2000

(51) Int. Cl.$^7$ ............................................. G06F 13/18
(52) U.S. Cl. ..................... 711/112; 711/111; 711/154; 711/158; 711/167
(58) Field of Search ................... 711/112, 154, 711/158, 151, 167; 709/103; 710/6, 39

(56) References Cited

U.S. PATENT DOCUMENTS

| | | | |
|---|---|---|---|
| 5,644,786 A | 7/1997 | Gallagher et al. | 710/30 |
| 5,708,632 A | 1/1998 | Totsuka et al. | 369/32 |
| 5,787,482 A | * 7/1998 | Chen et al. | 711/158 |
| 5,926,649 A | 7/1999 | Ma et al. | 711/111 |
| 6,023,720 A | * 2/2000 | Aref et al. | 709/103 |
| 6,078,998 A | * 6/2000 | Kamel et al. | 711/151 |
| 6,263,411 B1 | * 7/2001 | Kamel et al. | 711/167 |

FOREIGN PATENT DOCUMENTS

| | | |
|---|---|---|
| EP | 0716370 A2 | 11/1995 |
| WO | 99/15953 | 4/1999 |

OTHER PUBLICATIONS

"I/O Issues in a Multimedia System", Reddy, et al, IEEE Computer Society, Long Beach, CA, vol. 27, No. 3, Mar. 1, 1994, pp. 69–74.

International Search Report, application No. PCT/US01/07091, mailed Oct. 23, 2001.

* cited by examiner

Primary Examiner—Than Nguyen
(74) Attorney, Agent, or Firm—B. Noël Kivlin

(57) ABSTRACT

A disk scheduling system with bounded request reordering. Disk access requests may be performed during traversals of a disk head across a disk. Each traversal may have a specified direction of motion. A plurality of disk accesses may be performed during a disk head traversal. The overall number of disk access requests for a given disk head traversal may be limited to a maximum number N. By limiting the number of disk requests for each traversal, a bound may effectively be placed on the amount of time it takes to satisfy any single disk request.

30 Claims, 14 Drawing Sheets

| Traversal Number | Disk Request List | | | | | | | | | | Active? | Direction | # of Disk Requests |
|---|---|---|---|---|---|---|---|---|---|---|---|---|---|
| | 1 | 2 | 3 | 4 | 5 | 6 | 7 | 8 | 9 | 10 | | | |
| 1 | 0110 | 1001 | 2401 | 6A1F | A011 | BA10 | BAF1 | C101 | DF1A | FF10 | T | Low-to-High | 10 |
| 2 | 1 | 2 | 3 | 4 | 5 | 6 | 7 | 8 | 9 | 10 | F | High-to-Low | 10 |
| | FFAC | F001 | EA1F | B00A | 9AF2 | 7BC3 | 4D01 | 1F2A | 0101 | 0011 | | | |
| 3 | 1 | 2 | 3 | 4 | 5 | 6 | 7 | 8 | 9 | 10 | F | Low-to-High | 4 |
| | 0001 | 0111 | 10FA | 1FA1 | | | | | | | | | |
| 4 | 1 | 2 | 3 | 4 | 5 | 6 | 7 | 8 | 9 | 10 | F | High-to-Low | 0 |
| 5 | 1 | 2 | 3 | 4 | 5 | 6 | 7 | 8 | 9 | 10 | F | Low-to-High | 0 |
| 6 | 1 | 2 | 3 | 4 | 5 | 6 | 7 | 8 | 9 | 10 | F | High-to-Low | 0 |
| 7 | 1 | 2 | 3 | 4 | 5 | 6 | 7 | 8 | 9 | 10 | F | Low-to-High | 0 |
| 8 | 1 | 2 | 3 | 4 | 5 | 6 | 7 | 8 | 9 | 10 | F | High-to-Low | 0 |

Current Disk Block Address: 0110

2500

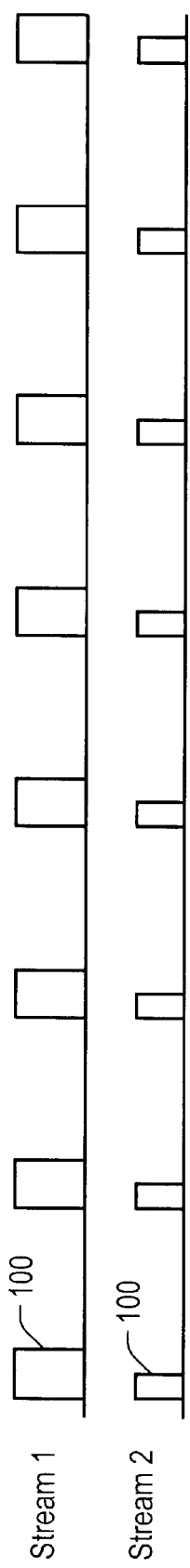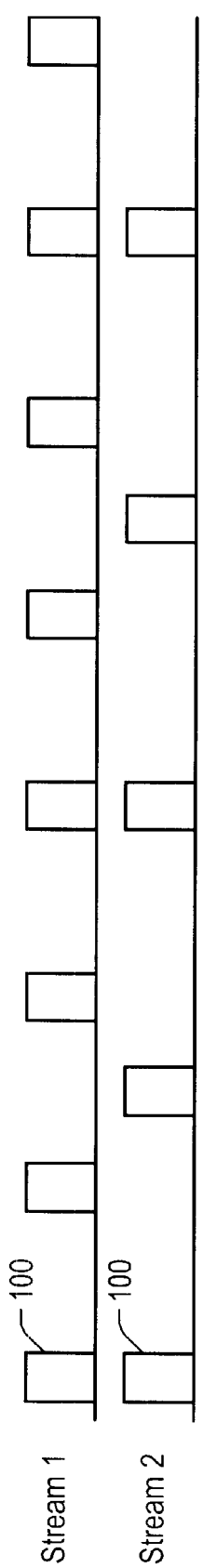

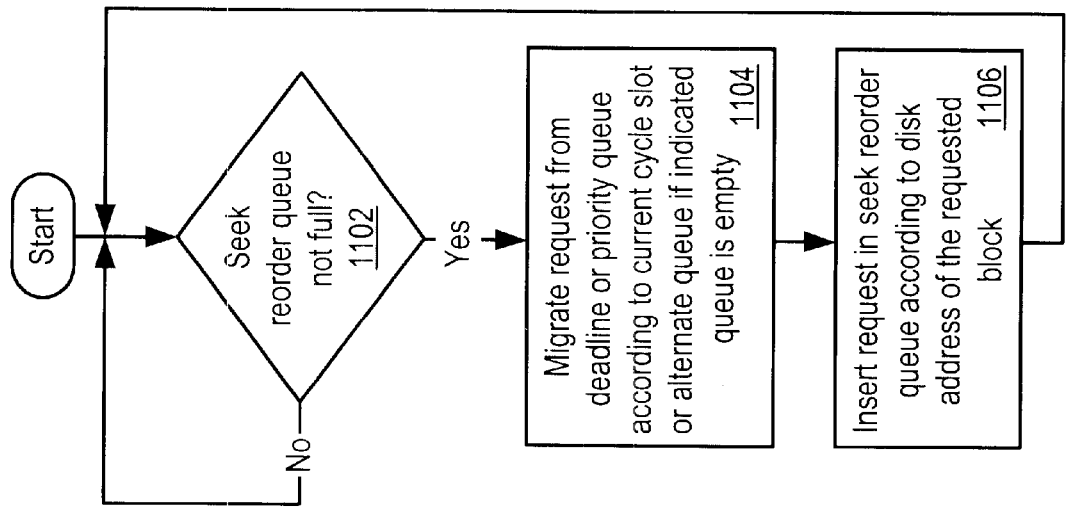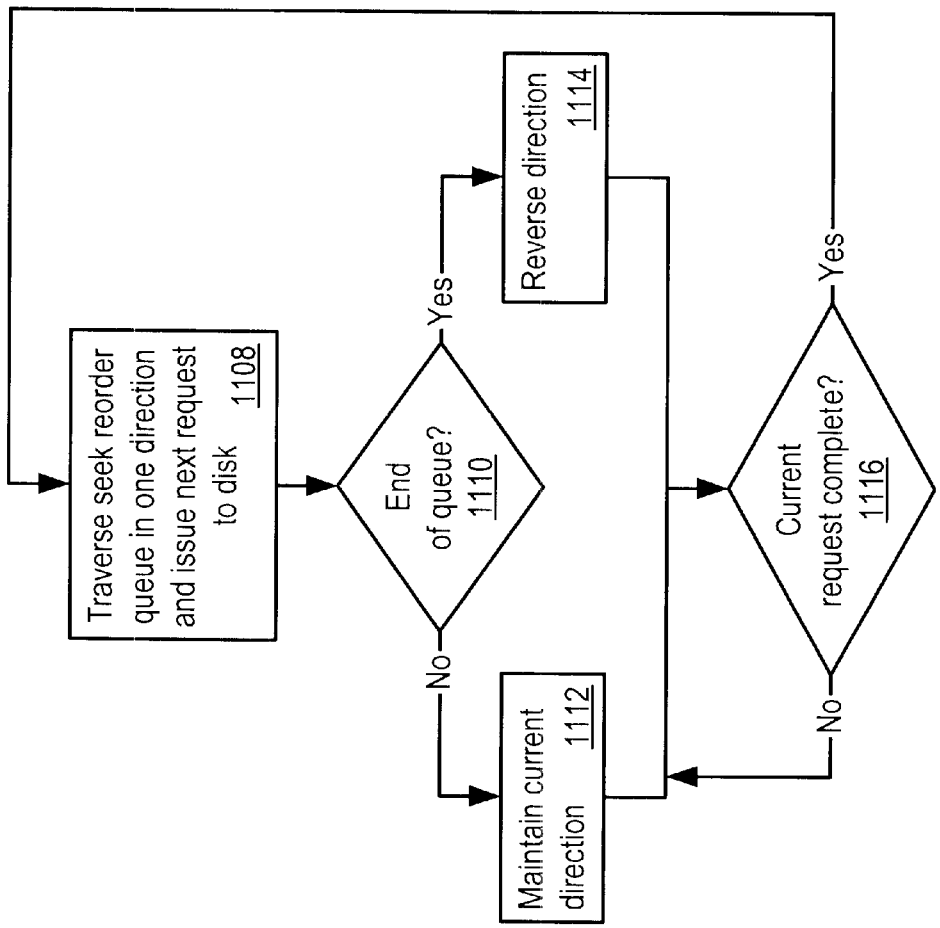
FIG. 11

| Traversal Number | Disk Request List | | | | | | | | | | Active? | Direction | # of Disk Requests |
|---|---|---|---|---|---|---|---|---|---|---|---|---|---|
| | 1 | 2 | 3 | 4 | 5 | 6 | 7 | 8 | 9 | 10 | | | |
| 1 | 0110 | 1001 | 2401 | 6A1F | A011 | BA10 | BAF1 | C101 | DF1A | FF10 | T | Low-to-High | 10 |
| 2 | FFAC | F001 | EA1F | B00A | 9AF2 | 7BC3 | 4D01 | 1F2A | 0101 | 0011 | F | High-to-Low | 10 |
| 3 | 0001 | 0111 | 10FA | 1FA1 | | | | | | | F | Low-to-High | 4 |
| 4 | | | | | | | | 8 | 9 | 10 | F | High-to-Low | 0 |
| 5 | | 2 | 3 | 4 | 5 | 6 | 7 | 8 | 9 | 10 | F | Low-to-High | 0 |
| 6 | | 2 | 3 | 4 | 5 | 6 | 7 | 8 | 9 | 10 | F | High-to-Low | 0 |
| 7 | | 2 | 3 | 4 | 5 | 6 | 7 | 8 | 9 | 10 | F | Low-to-High | 0 |
| 8 | | 2 | 3 | 4 | 5 | 6 | 7 | 8 | 9 | 10 | F | High-to-Low | 0 |

Current Disk Block Address: 0110

DISK SCHEDULING SYSTEM WITH BOUNDED REQUEST REORDERING

BACKGROUND OF THE INVENTION

1. Field of the Invention

This invention relates to computer data storage and server systems, and more particularly to digital video/audio storage and playback systems supporting multiple continuous media streams.

2. Description of the Relevant Art

Multimedia or video server systems are used in a variety of applications for the storage and playback of video, audio or other multimedia data streams. For example, multimedia servers may be used for broadcast, cable or satellite solutions to distribute multimedia information to clients or consumers. Professional broadcasters and associated service providers, such as networks and affiliates or cable providers, may employ digital video servers to support high bandwidth multimedia broadcast applications including multi-channel program playout, ad insertion, and digital content management. Other applications for multimedia server systems may include computer-based training in which multimedia training materials or lectures may be stored on the server system accessed by students over a network or the internet.

Video archiving, browsing and retrieval is another multimedia server application. Various movies may be stored by the server and distributed to users upon request. Video-on-demand or video delivery systems may enable a plurality of users or viewers to selectively watch movies or other audio/video sequences which are stored on one or more video servers or media servers. The video servers may be connected through data transfer channels, such as a broadcast cable system, satellite broadcast system or the internet, to the plurality of users or subscribers. The video servers may store a plurality of movies or other audio/video sequences, and each user can select one or more movies from the video servers for viewing. Each user may include a television or other viewing device, as well as associated decoding logic, for selecting and viewing desired movies. When a user selects a movie, the selected movie may be transferred on one of the data transfer channels to the viewing device of the respective user. Multimedia servers are also found in webcasting applications in which entertainment may be multicast on the internet to different subscribers. Multimedia servers are found in numerous other applications as well.

To meet the demands of many different applications and users, it is desirable for a multimedia server system to provide flexibility and extensibility. Two important requirements for a multimedia server system are storage space and file system bandwidth. Multimedia data, such as full-motion digital video, requires a large amount of storage and data transfer bandwidth. Thus, multimedia systems use various types of video compression algorithms to reduce the amount of necessary storage and data transfer bandwidth. In general, different video compression methods exist for still graphic images and for full-motion video. Video compression methods for still graphic images or single video frames may be intraframe compression methods, and compression methods for motion video may be interframe compression methods.

Examples of video data compression for still graphic images are RLE (Run-Length Encoding) and JPEG (Joint Photographic Experts Group) compression. Although JPEG compression was originally designed for the compression of still images rather than video, JPEG compression is used in some motion video applications. Most video compression algorithms are designed to compress full motion video. Examples of video compression techniques are MPEG (Moving Pictures Experts Group), MPEG-2, DVI (Digital Video Interactive) and Indeo, among others.

Even with the use of compression techniques, multimedia applications may still require extremely large amounts of storage. For example, two hours of video encoded at 1 Mb per second may require roughly one gigabyte (1 GB) of storage. A system supporting numerous different content may require up to several terabytes (TB) of storage. The server system must also be able to provide enough bandwidth for the various users to access selected multimedia content without overloading the storage system. For example, to support 100 simultaneous subscribers viewing multimedia content encoded at 1 Mb per second, a server may need to support a bandwidth in excess of 100 Mb per second when allowing for overhead. If enough bandwidth is not available, then some requests may have to be denied, or the play quality may suffer (video may run too slowly or may appear "jerky"). To meet such storage and bandwidth needs, a multimedia server may utilize one or more RAID (Redundant Array of Inexpensive Drives) storage systems. In a RAID system, for a given multimedia file, blocks of multimedia data may be stored across multiple hard disk units. The blocks may be read out or transferred to the communication network and transmitted or broadcast to the user or users. At the receiving end the blocks may be decoded for user viewing on a display device.

The disks of each hard disk unit may also be considered as being divided into zones. Since they are physically larger, tracks in zones at the outer disk contain more sectors than tracks in zones near the rotational axis of the disk. Therefore, assuming the disks rotate with a constant velocity, the data bandwidth available from the outer most zones is greater than the data bandwidth available from the innermost zones. Even with modem hard disk drives, there can be a 2-1 variation between worst case and average case disk transfer bandwidth due to sectors/track variations between outer and inner zones.

Many multimedia applications require continuous media streams in which data streams must be delivered at a specified and possibly time-varying data rates and with a specified uniformity of that delivery rate. In some cases, the uniformity of the delivery rate may be adversely affected by the algorithm used to satisfy disk access requests. The use of a "first-come, first-served" disk access algorithm may not always be the most efficient way to satisfy disk requests, as motion of the read-write head (used to access information from the disk) may be less than optimal. Some optimization of head motion may be realized through the use of algorithms that re-order the disk requests. In such re-ordering algorithms, disk requests may be satisfied in an order different from the order in which they were made. One such re-ordering algorithm is known as an "elevator" algorithm. In one typical elevator algorithm, the head of the disk storage system sweeps from the outer disk to the inner disk, satisfying and queued disk request along the way, and then reversing direction. While this algorithm may allow for more efficient motion of the read-write head, highly non-uniform access times may still be present, as newly arriving requests may be satisfied prior to previously queued requests. A large number of newly arriving requests may cause long delays in satisfying previously queued requests.

Non-uniform disk access times may be detrimental to many applications, particularly multimedia applications. For example, video playback from a disk storage system may appear erratic when disk access times are non-uniform. Audio playback may be affected in a similar manner. As such, the quality of a multimedia presentation accessed from a disk storage system with non-uniform access times may suffer.

SUMMARY OF THE INVENTION

The problems outlined above may in large part be solved by a system and method of bounded disk request reordering in accordance with the present invention. In one embodiment, disk access requests may be performed during traversals of a disk head across a disk. Each traversal may have a specified direction of motion. A plurality of disk accesses may be performed during a disk head traversal. In some cases, disk accesses may be performed in an order different from the order in which the original disk access requests were received. The overall number of disk access requests for a given disk head traversal may be limited to a maximum number N. By limiting the number of disk requests for each traversal, a bound may effectively be placed on the amount of time it takes to satisfy any single disk request, despite any reordering. Disk head motion may be optimized as well.

In a further embodiment, a disk storage system maintains a list of disk head traverses, known as a traversal list. Each traverse includes several components. The first component of a traverse is a variable for the direction of disk head motion for a given traverse, and may be given a value of "low-to-high" or "high-to-low". In effect, this variable determines whether a given traverse will read from the outer portion of the disk to the inner portion, or vice versa. The second component of the traverse is an ordered list of disk access requests (the disk request list) which are to be satisfied during the given traverse. The third component of a traverse is a variable indicating the number of disk requests in the disk request list. This variable is bounded to a maximum value ("N") in order to limit the number of disk requests that may be satisfied for a given traverse. A fourth component of a traverse is the Boolean variable "Active". The active variable may be set to a value of false prior to conducting the traverse, and may become true when the traverse is in effect. The final component of a traverse is the current disk block address, or the disk address at which the disk head is located at a given instant in time. Since the direction of motion of the disk head alternates with each new traversal, the number of traverses in the traversal list may be constrained to be even.

The system of one embodiment may perform two algorithms, a queuing algorithm for queuing incoming disk requests, and an execution algorithm for satisfying the queued requests. The queuing algorithm performs the function of placing a newly arrived disk request into a traverse of the traversal list. The newly arrived request may be placed into the disk request list of an active traverse (active=true) or a pending traverse (active=false). The execution algorithm carries out the queued requests of each traverse of the traversal list.

The structure of the algorithms may allow for optimization of disk head motion and more uniform disk access times, despite any reordering. Since the number of disk requests for a given traverse is bounded by a maximum value ("N"), the amount of time to satisfy a given disk request may be bounded as well. In effect, the system utilizes an elevator algorithm with a bounded maximum delay for a given disk request.

Thus, in various embodiments, the system and method of bounded disk request reordering may allow disk requests to be reordered and satisfied within specified bounds. This may result in an optimization of disk head motion, and furthermore, allow for more uniform disk access times. The uniformity of disk access times may make the system more suitable for certain applications in which a relatively steady data stream is required. As such, the system may be particularly suited for use with various multimedia applications.

BRIEF DESCRIPTION OF THE DRAWINGS

Other objects and advantages of the invention will become apparent upon reading the following detailed description and upon reference to the accompanying drawings in which:

FIG. 1 illustrates a constant time/variable data rate dependent data placement/scheduling mechanism;

FIG. 5 illustrates one example of a constant data, variable time rate-independent placement mechanism of the video storage manager for two simultaneous continuous media streams;

FIG. 11 is a flow chart illustrating operation of the seek reorder shown in FIG. 10;

FIG. 15 is an example of one embodiment of a traversal list which may be used for scheduling disk access requests using the method of FIG. 14.

Figure 2:
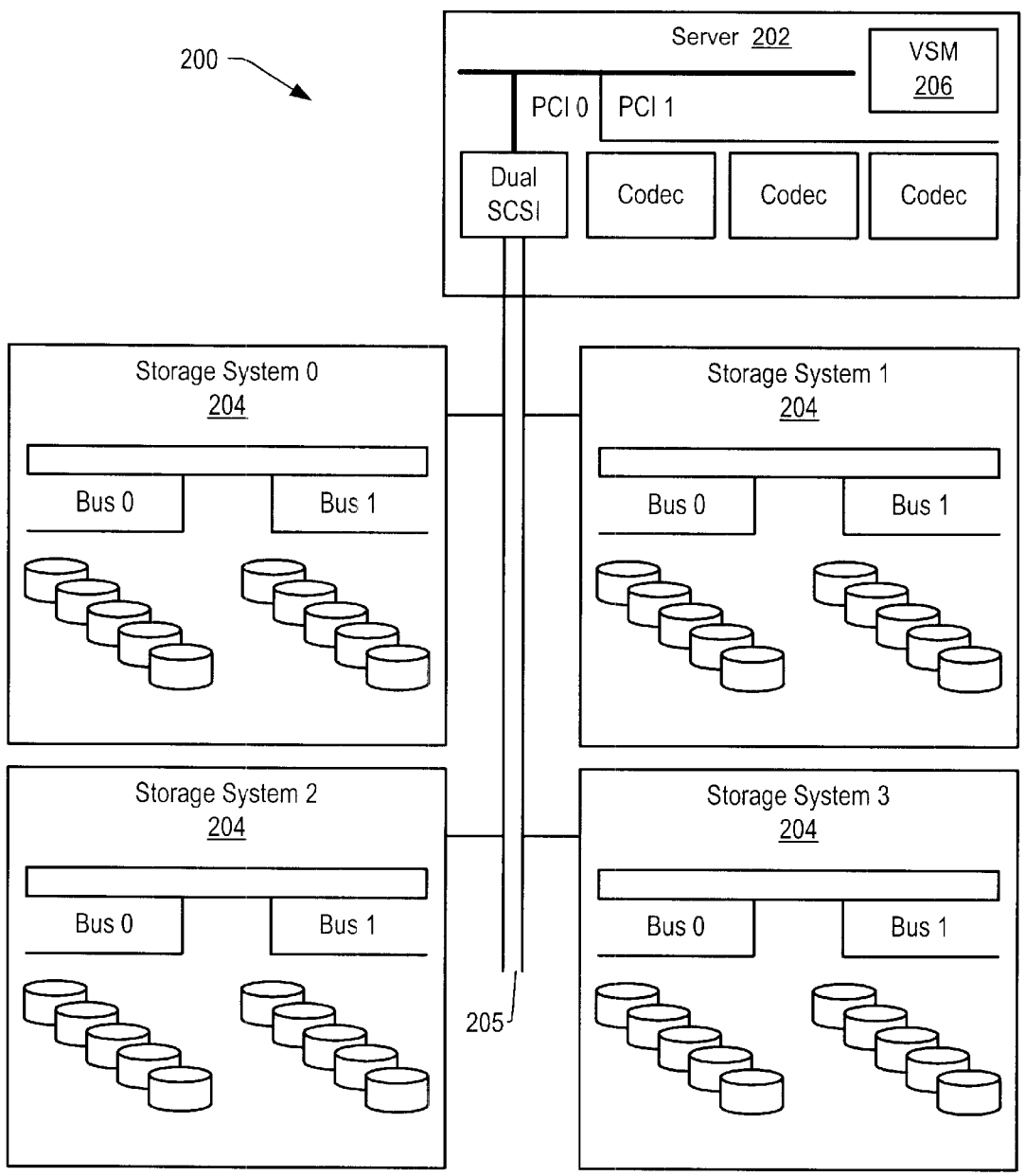
FIG. 2 is an illustration of a video server and storage system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined be the appended claims.

DETAILED DESCRIPTION OF THE INVENTION

Referring now to FIG. 2, a video server and storage system 200 is illustrated. System 200 includes server 202 and storage systems 204. The storage systems 204 may be connected to the server 202 by one or more buses 205. The server may include one or more processors (not shown) which may communicate with the storage systems 204 via a peripheral bus, such as one or more PCI buses and one or more SCSI interfaces. The server 202 may also include a number of codecs for encoding and decoding multimedia data streams. The codecs may also be coupled to one or more PCI buses. Each storage system 204 may include one or more RAID systems as shown.

In order to support multiple continuous media streams in which data streams are delivered at a specified and possibly time-varying data rate, the server 202 includes a video storage manager 206. The video storage manager controls the storage and access of multimedia streams on the storage systems 204. In a preferred embodiment, multimedia files are stored via the video storage manager 206 in high quality MPEG-2 format, although other suitable compression formats may be used. Clients or requestors for a multimedia stream contract with the video storage manager 206 for access to a file at a desired bit rate. The video storage manager 206 assesses available storage bandwidth and available buffer memory to determine whether or not the request can be met. Once the video storage manager has established that the request can be accommodated, the client is given access to the file at any bit rate up to the contracted rate. If the request exceeds available storage bandwidth and/or buffer memory is exhausted, the video storage manager must reject the request and the client is free to adjust and/or resubmit the request at a later time. By providing a guaranteed stream rate the video storage manager fully supports variable bit rate accesses in addition to constant bit rate accesses. A client may arbitrarily vary the rate of access to a file from zero bits per second to any point up to the contract rate. This flexibility supports a number of features including frame accurate initiation and jog/shuttle functionality.

Multiple different clients may request different streams at different bit rates from the video storage manager. These streams may be an arbitrary mix of reads, writes, stream rates and files accessed. Each stream may have a different contract rate and an individual stream may arbitrarily range in rate up to the contract rate wherein the total aggregate for all stream rates does not exceed the total aggregate streaming capacity of the server system. There is no requirement that all streams be of the same bit rate, or that the bit rate of a stream be chosen from a set of discrete allowable rates. The video storage manager also permits clients to access the same files, different files, or any combination in-between. As will be described below, the video storage manager provides this flexibility without impacting on server aggregate bandwidth.

Figure 3:
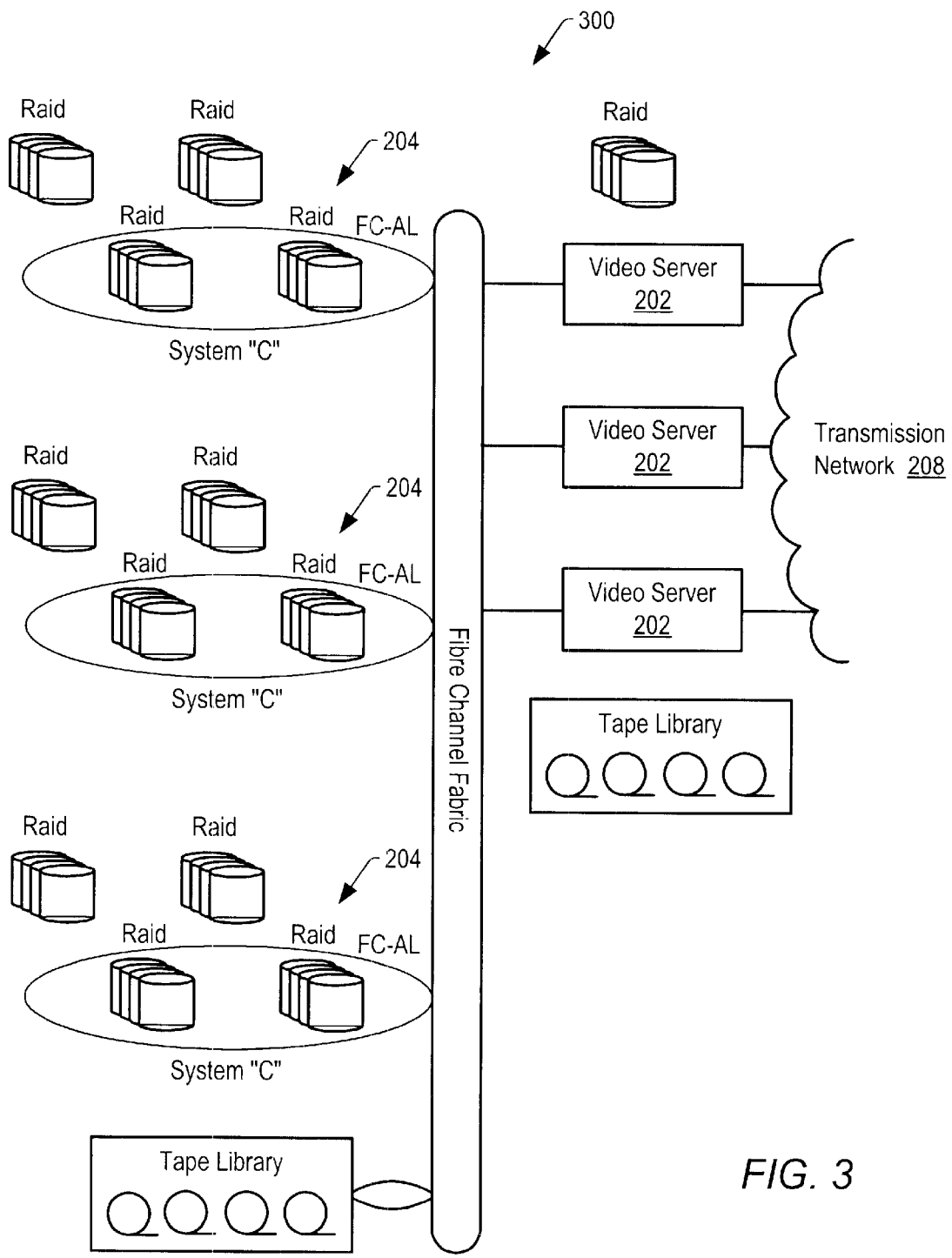
FIG. 3 is an illustration of a distributed multimedia file system employing a number of video servers and files systems.

Turning now to FIG. 3, a distributed multimedia file system 300 is illustrated employing a number of video servers 202 and files systems 204. In this embodiment the files systems 204 communicate with video servers 202 via fibre channel. Each storage system 204 may include a number of RAID systems linked on a fibre channel arbitrated loop (FC-AL). Each video server 202 may also connect to its own local file system or tape library, for example. In addition, other storage systems, such as a tape library, may be accessible to the system on the fibre channel.

Clients may request multimedia streams to be sent on transmission network 208. Transmission network 208 may be a computer network, the internet, a broadcast system or any other suitable transmission medium for multimedia streams. A video storage manager executing on one or more of the video servers controls the initiation and addition of multimedia streams for accessing files on storage systems 204. The video storage manager manages multiple continuous media streams to be delivered through a wide range of hardware interfaces, such as MPEG encoders and decoders, DVB multiplexors, ATM, SONET, and ethernet, to transmission network 208.

The video storage manager as employed in systems such as illustrated in FIGS. 2 and 3, addresses how to schedule disk or storage accesses for multiple continuous sequential media streams in a manner that guarantees data for all continuous media streams and provides an accurate mechanism for determining whether a new request for guaranteed rate access can be accommodated.

Figure 4:
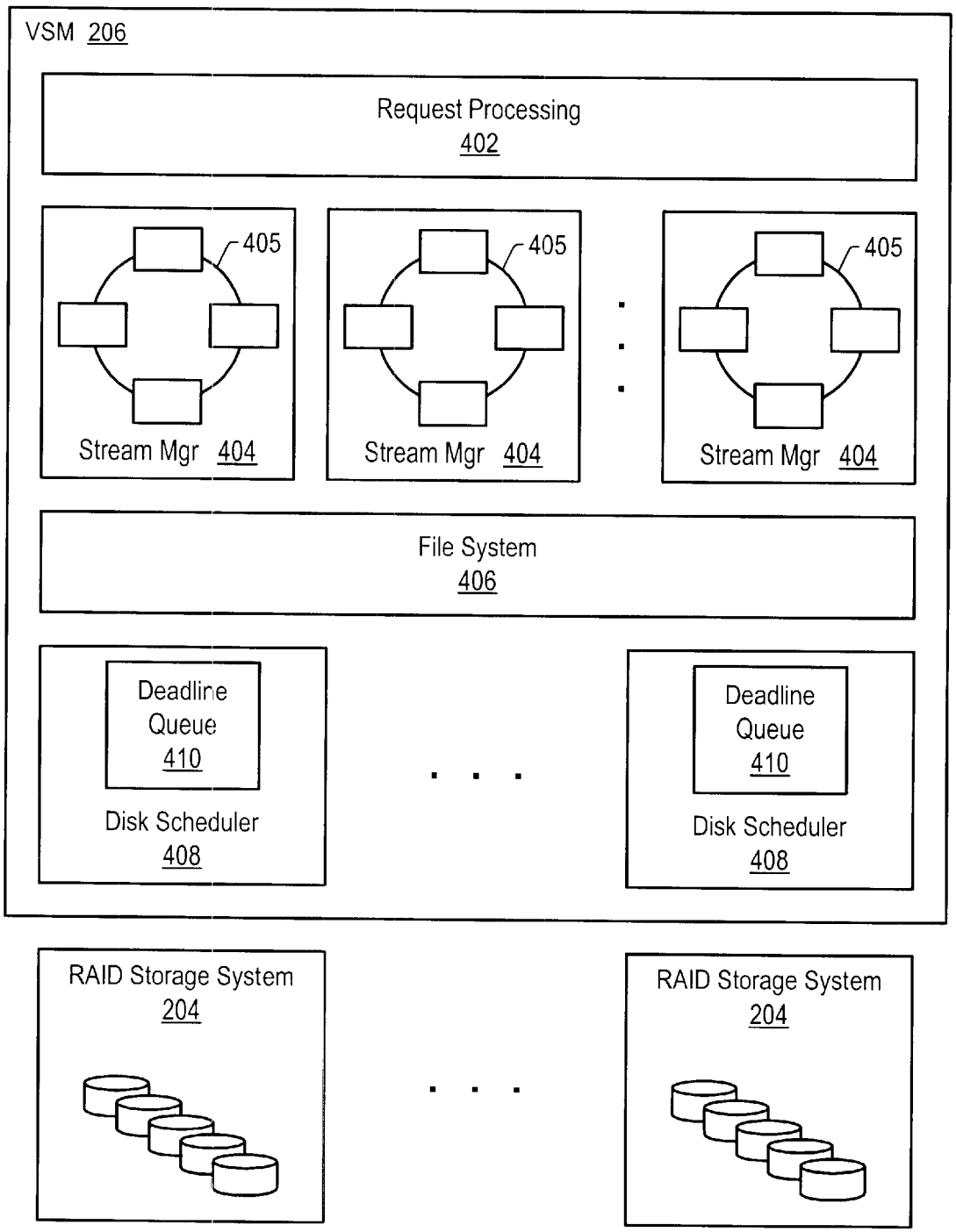
FIG. 4 is a detailed diagram of a video storage manager.

Turning now to FIG. 4, a detailed diagram of a video storage manager 206 is shown. The video storage manager 206 includes a request processor 402 which interfaces client requests to stream managers 404. Each stream manager 404 maintain a buffer ring 405. A separate stream manager 404 corresponds to each continuous multimedia stream. A file system 406 is provided for mapping stream accesses to the storage systems 204. Disks schedulers 408 are provided for each storage system 204 to manage to flow of storage accesses to each storage system. Each disk scheduler may include a deadline queue for 410, as described in more detail below.

The video storage manager, file system, and disk scheduler place stream data on the storage systems in a manner that is completely independent of the inherent bit rate of that material. This feature provides for additional flexibility in that clients may transfer content on and off the video storage manager file system with guaranteed rate service at data rates many times higher (or lower) than the inherent rate of the stream data. The video storage manager, file system, and data placement mechanism is a fixed block size mechanism. For example, data is transferred to or from the storage systems in a constant block size. In a preferred embodiment a block size of 256 kilobytes may be chosen. The video stream manager may provide for configuration of the block size during system initiation or configuration. The fixed block size mechanism ensures that no external fragmentation of storage occurs and that internal fragmentation occurs only at the last block of the file (since a file is unlikely to end exactly at a block boundary). Unlike rate-dependent, variable block size mechanisms, which suffer from both external fragmentation and varying levels of per block internal fragmentation that results in great variations and storage requirements for a particular file depending on stream rate and current file system contents, the video storage manager's rate independent fixed block size mechanism ensures predictable storage requirements for any file regardless of rate or current file system contents.

Turning briefly to FIG. 5, one example of the constant data, variable time rate-independent independent placement mechanism of the video storage manager is illustrated for two simultaneous continuous media streams. As shown, the data block size is fixed for all media streams, but the time at which a data block is accessed varies for each stream according to the desired bit rate.

One problem that arises from a constant data (fixed block), variable time access scheduling mechanism is that multiple streams, each with its own frequency and phase of storage accesses, make requests to the storage system and the interaction of these access patterns results in peaks and lulls in the storage activity. The different frequency and phases of storage accesses by the different streams results in times in which numerous accesses may be pending at once and other times in which very few accesses may be pending. One solution to this problem is to simply require the storage systems to support the peak rate of activity, however, this solution is clearly not cost effective.

Referring back to FIG. 4, the virtual storage manager of the present invention addresses the above-noted problem by leveling storage activity by introducing a ring of buffers between each client and the file system. Each media stream is associated with a different buffer ring 405 managed by a stream manager 404. Thus, the stream manager 404 associates a ring of data buffers between the requester of continuous media and the disk subsystems. The number of buffers in a ring is determined according to the contracted guarantee rate of the associated media stream and characteristics of the storage system so that the guaranteed rate is always met. The buffer rings 405 exploit the fact that video streaming is inherently sequential and lets the file system pre-queue storage requests. This approach allows future requests to be satisfied during lulls, shifting the load from peaks to valleys and smoothing storage activity over time.

Each ring 405 of N buffers is used to hold the next N blocks of the continuous media stream to be accessed by the requester. Once a buffer in the ring has its data consumed by the requester, an access to fill the now empty buffer is queued to the appropriate disk scheduler 408 in order to fill the empty buffer with the next block for the media stream. Requests to fill (or empty) buffers of buffer rings 405 are mapped by file system 406 to the appropriate disk scheduler 408. File system 406 maps logical blocks to physical blocks in the storage systems 204. The file system 406 may maintain a map of logical to physical block locations (e.g. an inode). Because requests for multiple streams may be queued in each disk scheduler 408, the system must ensure that future request from one stream are not fulfilled before more urgent requests from another stream so that the guaranteed rate may be maintained for each stream. To accomplish this goal deadlines are associated with each request submitted to the storage a system. The system calculates the deadline to coincide with the time a buffer will be needed by noting the stream rate block size and the number of existing unconsumed buffers. When a request for an empty buffer is queued, a deadline time is queued with the request in the appropriate deadline queue 410 in the disk scheduler 408. The deadline time indicates the latest time when the buffer can be filled and still meet the guaranteed rate requirement of the particular stream. The deadline time is calculated as: current_time+(N-1) * buff_time, where N is the number of buffers in the buffer ring 405 and buff_time is the minimum time in which a requestor can consume a buffer without exceeding the contracted rate guarantee. The disk scheduler 408 must now issue the queue request to the particular storage system 204 in an order which meets the deadlines associated with the requests. The disk scheduler places requests from continuous media requesters into each deadline queue 410 and maintains an order of earliest to latest so that requests with the earliest deadline are satisfied first.

In order for the system to meet a stream's deadline it must set up a sufficiently large buffer ring to ensure that any request can be queued with the storage system far enough in advance of its deadline so that the worst possible service time for the request will not exceed the deadline. Because worst case service time is a function of the aggregate load on the system, and the aggregate load is a direct result of the aggregate stream rate (independent of the actual stream rate mix), buffer ring size for a particular stream on a given storage system is a function of that particular stream's rate and is independent of the stream rates of other streams in the mix. Given this independence, appropriate ring sizes for various stream rates may be generated at storage characterization time as detailed further below.

Figure 6:
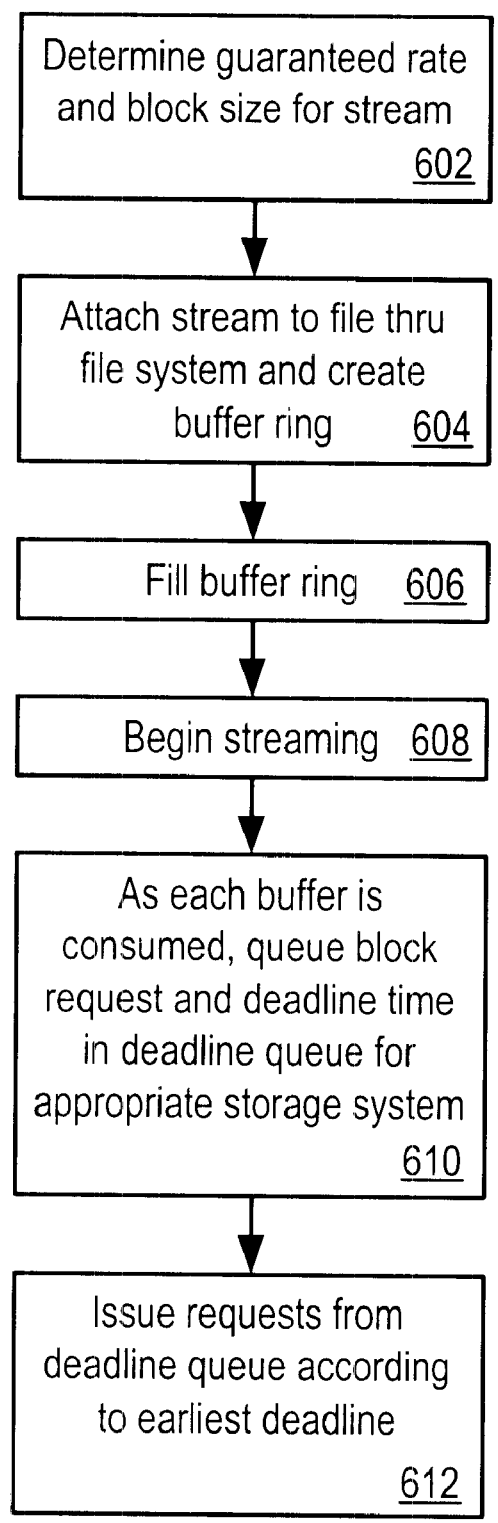
FIG. 6 is a flow chart illustrating a constant data, variable time access mechanism employing buffer rings and deadline queues.

Turning now to FIG. 6 a flow chart is provided illustrating the constant data, variable time access mechanism employing buffer rings 405 and deadline queues 410. When a new stream is initiated, the stream manager for the new stream determines the guaranteed stream rate and the block size for the stream as indicated at 602. The stream is attached to the requested file through the file system 406 and the stream manager 404 creates the buffer ring 405 for the new stream. Requests for blocks from the associated file are then issued to the appropriate storage systems to fill the buffer ring. Each buffer may be sized for one block. After the buffer ring is filled (606) streaming may begin as indicated at 608.

As each buffer is consumed by the stream requester, a block request is issued along with a deadline time to fill the now consumed buffer, as indicated at 610. The block request and deadline time are queued in the deadline queue 410 for the appropriate storage system according to where the requested block is located. The requests are ordered in the deadline queue from earliest to latest deadline time. Requests are issued from the deadline queue according to the earliest deadline as indicated at 612. During streaming the buffers of the buffer ring are accessed one after another in a circular manner. The deadline time assures that each buffer is filled before it is needed by the stream requester according to the guaranteed rate. The buffer ring and associated deadline times take advantage of the inherently sequential nature of multimedia streaming to pre-queue storage requests. This allows future requests to be satisfied during lulls of storage activity thus shifting the load from peaks to valleys and smoothing storage activity over time. Note that while FIG. 6 has been described in terms of stream read requests, the same mechanism may be employed for write stream requests. As each buffer is filled with a block of stream data a request and deadline may be queued in a deadline queue to write the block into the storage system.

The video storage manager 206 supports a plurality of different media stream clients at different rate guarantees. A different media stream manager 404 and ring buffer 405 may be provided for each stream. A separate disk scheduler 408 and deadline queue 410 are provided for each storage system 204. Thus, each deadline queue 410 may include requests corresponding to several different media streams. The deadline times for each request in the deadline queues 410 are all calculated relative to a common current time so that the earliest deadline from any requester stored in a particular deadline queue is issued first. The time between requests being satisfied for any particular stream varies depending upon the number of other pending requests, however, the associated deadline time assures that the rate guarantee will be met.

In addition to providing for rate guaranteed continuous media streams, it may be desirable for a multimedia server to provide access to data stored in the storage systems in a prioritized but non-late guaranteed manner. Such accesses should not impact the guarantees made for the continuous rate-guaranteed media streams. For example, an NFS or FTP requester may wish to access a file. Typically such accesses are non-real-time and no rate guarantee is required. Such accesses may be satisfied using residual disk bandwidth available after all guaranteed rate accesses are satisfied. Any storage bandwidth that remains after all guaranteed rate requests have been met is allocated to a general pool. Available bandwidth clients may access this bandwidth on a first come, fist served basis. The video storage manager dynamically determines the amount of available bandwidth. Any bandwidth from an unused guaranteed rate contract may become part of the pool of available bandwidth.

Figure 7:
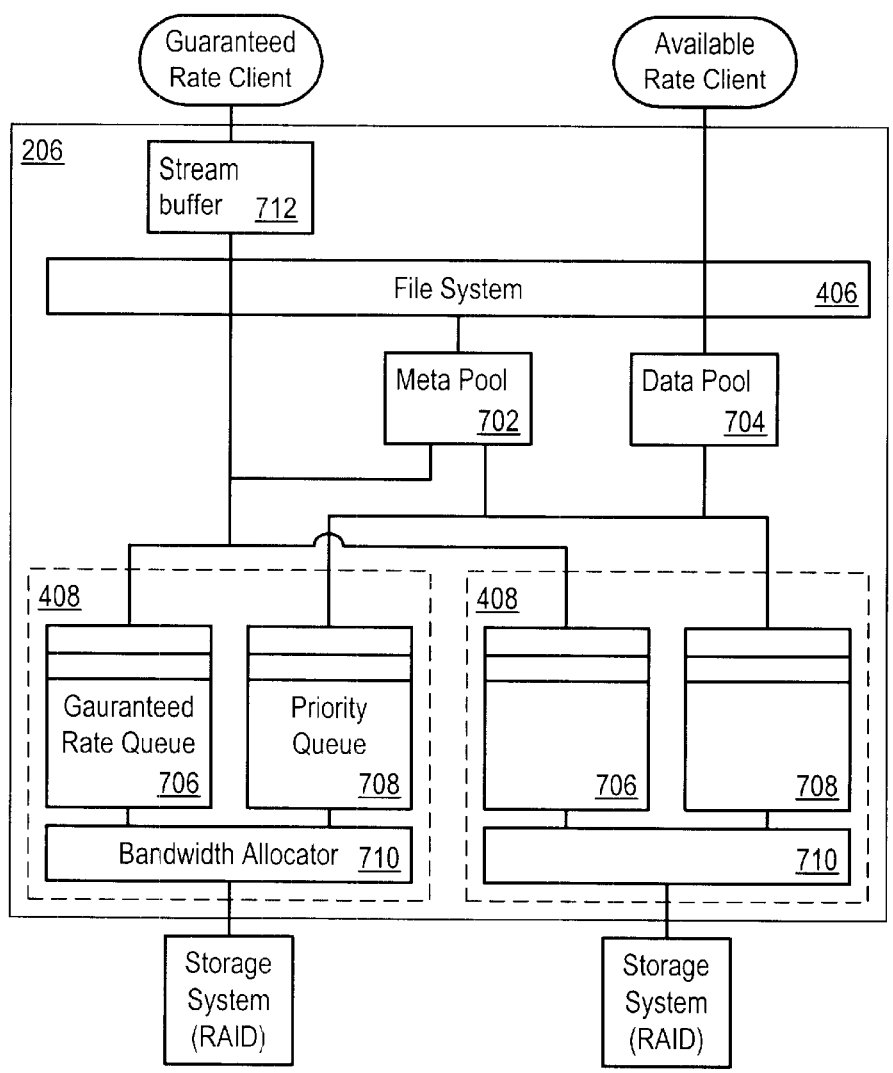
FIG. 7 illustrates a system which provides for both guaranteed rate streams and non-rate-guaranteed available rate accesses.

Turning now to FIG. 7 a system is illustrated which provides for both guaranteed rate streams and non-rate-guaranteed available rate accesses. As shown in FIG. 7 the video storage manager 206 may accept requests from both guaranteed rate clients and available rate clients. A stream buffer 712 may be associated with each guaranteed rate client. In a preferred embodiment, each stream buffer 712 is a buffer ring as described in regard to FIGS. 4 and 6. Guaranteed rate requests are mapped by file system 406 to an appropriate disk scheduler 408 and queued in a guaranteed rate queue 706. In a preferred embodiment the guaranteed rate queue is a deadline queue as described in regard to FIGS. 4 and 6. Available rate requests that are non-rate guaranteed are also mapped by file system 406 to the appropriate disk scheduler for the storage system in which the requested data is located. A data pool 704 may be provided as a shared buffer for the available rate requests. Available rate requests are queued in a priority queue 708 associated with each storage system. Another source of file requests may be the file system 406 itself. These requests may include requests for metadata required to support the various data streams (e.g. blocks that holds lists of blocks to stream, such as indirect blocks). These type of metadata requests may be time critical in that streaming will stop if a stream pointer block (indirect block) pointing to the next data block to the stream is unavailable. Thus, request for time critical metadata also carry deadlines and may be scheduled directly along with streaming data requests in the guaranteed rate or deadline queue 706. The file system constantly monitors its progress by means of the current indirect block. At an appropriate threshold it calculates a deadline and schedules the fetch of the next indirect block from the storage system. Other metadata requests may be non-critical such as other types of file management and read and write operations unrelated to streaming (e.g. listing files in the file system). These non-time-critical metadata requests are queued in the priority queues 708. A metadata pool 702 may be associated with file system 406 from which the metadata requests are issued.

Although other metadata requests and available bandwidth requests do not have strict service time requirements, they may have a priority relationship. For example, metadata writes may be considered the highest priority because their completion may be essential for closing a particular stream episode. Metadata reads may be next in priority to ensure timely processing of file lists, file creations, etc. Available I/O requests may have the lowest priority and may be filled when resources are available. Requests in the priority queues are ordered from highest to lowest priority.

The disk scheduling mechanism issues the queued requests to the storage system in an order which meets the deadlines associated with the requests and also allocates residual bandwidth after guaranteed requests to non-guaranteed requests in a manner consistent with their associated priorities. A bandwidth allocator 710 may be employed to allocate a certain portion of storage bandwidth to guaranteed rate requests and the remaining bandwidth portion to non-guaranteed priority requests. At storage characterization time a configurable percentage of a storage system's bandwidth is reserved for honoring the non-guaranteed priority requests. For example, 90 percent of the bandwidth may be reserved for the guaranteed rate requests from guaranteed rate queue 706 and the remaining 10 percent allocated to non-rate guaranteed requests from priority queue 708. Based on the percentages reserved for guaranteed and non-guaranteed requests, the disk scheduler chooses a request from one or the other queue to hand off to the operating system to be satisfied from the storage system. When the chosen request queue is empty, the scheduler attempts to de-queue a request from the other queue thus allowing both non-guaranteed and guaranteed requests to absorb unused storage bandwidth.

Figure 8:
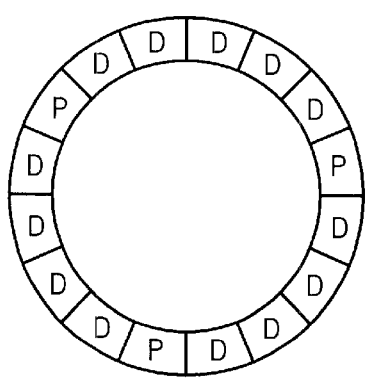
FIG. 8 illustrates an example of a cycle by which requests are migrated from the deadline and priority queues to the storage system.

In a preferred embodiment requests are migrated from the deadline and priority queues to the storage system according to a cycle. An example of a cycle is shown in FIG. 8. A cycle is of a fixed number of slots with each slot assigned to either the deadline queue or priority queue in proportion equal to the desired allocation of disk bandwidth between guaranteed and non-guaranteed accesses. In FIG. 8, slots marked with a D point to the deadline queue and slots marked with a P point to the priority queue. The slot is repeatedly traversed and a request is chosen from one of the queues according to the current slot. In the example of FIG. 8, the bandwidth is proportioned so that the disk scheduler will first look to the deadline queue for 13 out of every 16 storage accesses and first look to the priority queue for the remaining three out of every 16 accesses. This allocation is merely one example and in a preferred embodiment the allocation may be nine out of ten slots pointing to the deadline queue and one out of every ten slots pointing to the priority queue. In a preferred embodiment the slots allocated to each use are as evenly distributed as possible throughout the cycle.

In a preferred embodiment requests from the deadline and priority queues are migrated to the storage system according to the current slots and the cycle then advances to the next slot. If the queue indicated by current slot is empty then an entry from the other queue is chosen if it is not empty. Therefore, non-rate guaranteed requests may actually achieve more when their allocated bandwidth if the full rate guarantee bandwidth through the deadline queue is not being utilized.

Figure 9:
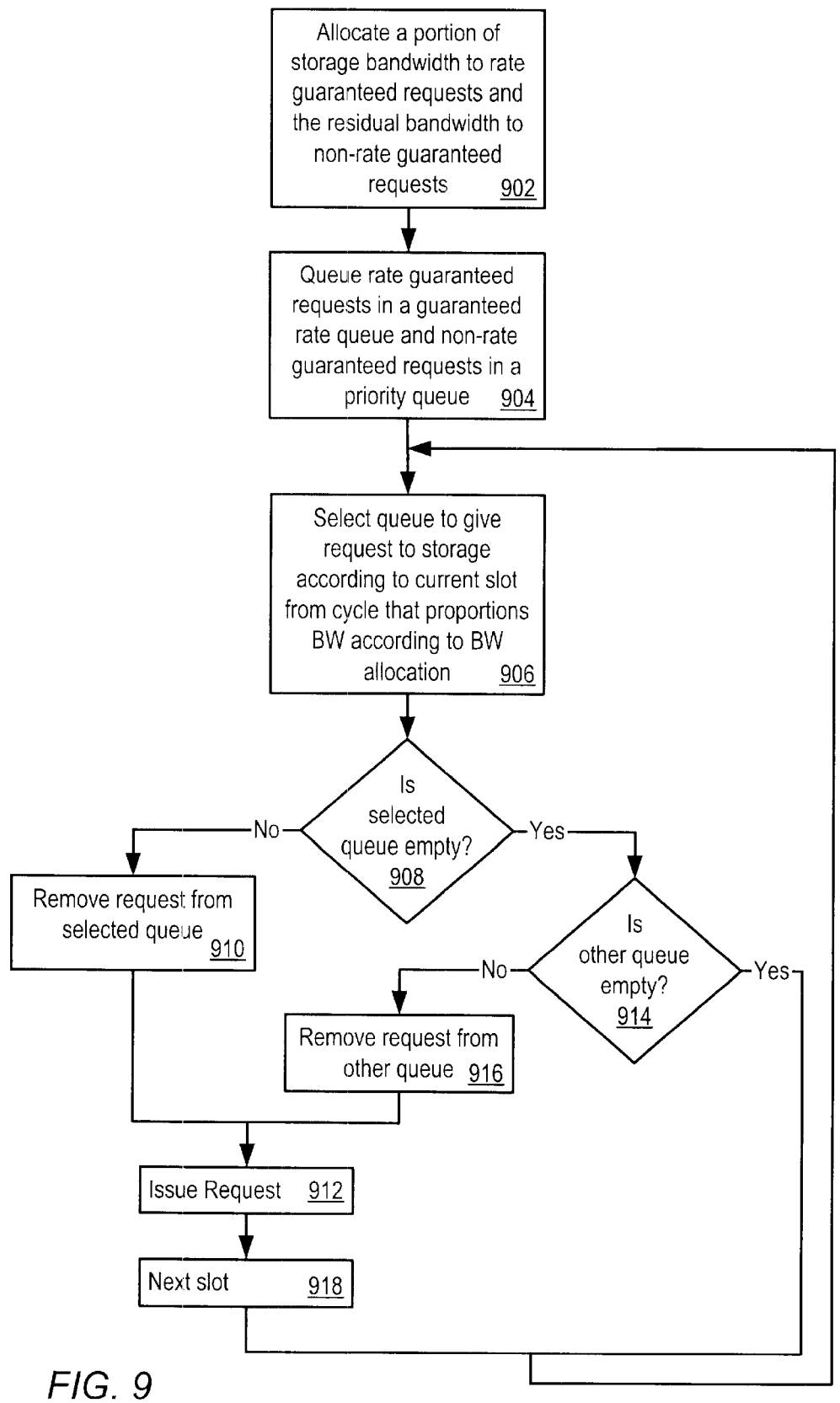
FIG. 9 is a flow chart illustrating a method for providing storage access for multiple continuous media streams with a rate guarantee and storage access for non-rate guaranteed requests.

Turning now to FIG. 9 a flow chart is provided illustrating a method for providing storage access for multiple continuous media streams with a rate guarantee and storage access for non-rate guaranteed requests. A portion of the storage bandwidth is allocated to rate guaranteed requests and the residual bandwidth is allocated to non-rate guaranteed requests, as indicated at 902. Rate guaranteed requests are queued in a guaranteed rate queue and non-rate guarantee requests are queued in a priority queue, as indicated at 904. The rate guaranteed requests are entered into and issued from the rate guaranteed queue in a manner to ensure that they are satisfied in a timely fashion to meet the particular rate guaranteed for each stream. The non-rate-guaranteed requests may be ordered in the priority queue so that higher priority requests are satisfied before lower priority requests. The system then selects a queue to issue a request to the storage system according to a current slot from a cycle that proportions the storage bandwidth according to the bandwidth allocation, as indicated at 906. If the selected queue contains an entry, then that request is issued from the selected queue, as indicated at 908, 910 and 912. If the selected queue is empty, then the system looks to the other queue for a request to issue, as indicated at 908 and 914. If the other queue is not empty, then an entry is removed and issued, as indicated at 916 and 912. The system then traverses the cycle to the next slot, as indicated at 918, and repeats the queue selection process. If the other queue is empty at 914, the process is repeated until a queue is found containing an entry. In one embodiment, the slot is not advanced if both queues are empty. Alternatively, the slot may be advanced if both queues are empty.

Figure 10:
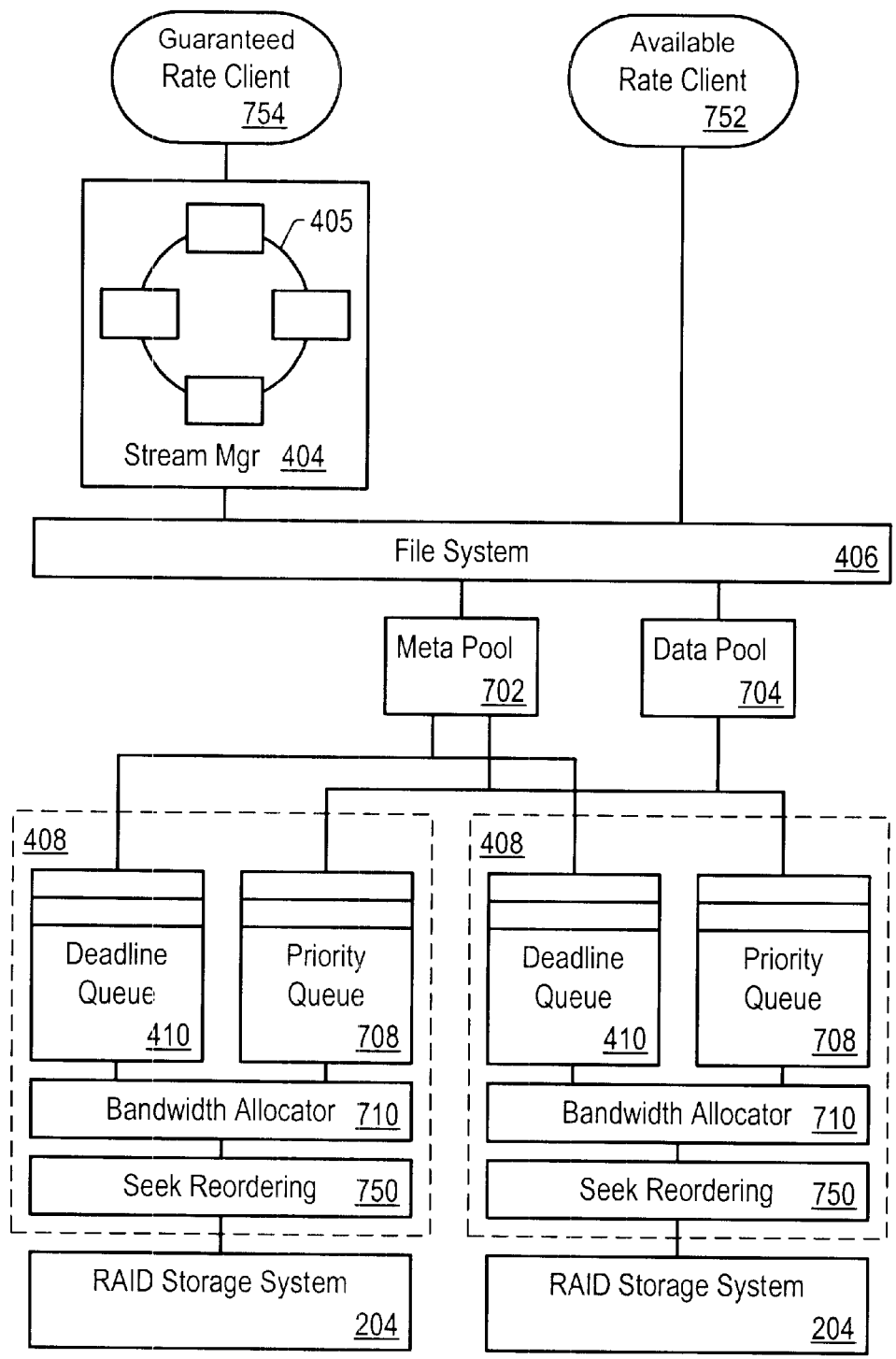
FIG. 10 illustrates a video storage manager combining mechanisms illustrated in FIGS. 4 and 7.

Turning now to FIG. 10 a video storage manager is illustrated combining the mechanisms as discussed in regard to FIGS. 4 and 7. The storage manager of FIG. 10 supports multiple continuous media streams in which clients contract for access to a file at a guaranteed bit rate. Each stream client is allowed to vary the rate of its access to its file from any rate up to the guaranteed rate. In addition, the storage manager of FIG. 10 support available bandwidth clients. A certain portion of the storage bandwidth is allocated to available bandwidth or non-rate guaranteed clients, such as available rate client 752. In addition, any bandwidth not used by the guaranteed rate clients may be available for the available rate clients. Thus, the video storage manager of FIG. 10 may support any mix of guaranteed rate clients while delivering the same aggregate bandwidth and also support available rate clients at a non-guaranteed rate.

As discussed in regard to FIG. 4, each guaranteed rate client communicates with an associated stream manager 404 which maintains a buffer ring 405 for the particular stream. The buffer ring is used to hold the next N blocks of the continuous media stream to be accessed by the requester where N is the number of buffers in the buffer ring. Each buffer may be sized equally for one block of data per buffer. Once a buffer in the ring has its data consumed by the requester, a request for the now empty buffer along with a deadline time its queued with the appropriate disk scheduler 408 as determined by file system 406. The deadline time indicates the latest time when the buffer request can be satisfied and still meet the guaranteed rate requirement of the stream. The deadline time may be calculated as:

$$\text{deadline\_time} = \text{current\_time} + (N-1) * \text{buff\_time}$$

where N is the number of buffers in the ring and buff time is a minimum time in which the requester can consume a buffer without exceeding it contracted rate guarantee. Simultaneously with guaranteed rate request being queued with the appropriate disk scheduler 408, prioritized but non-guaranteed rate request are also queued. Non-guaranteed rate request do not carry deadlines but do carry priorities. The disk schedulers issue the queued requests to the storage systems in an order which meets the deadlines associated with the requests while obtaining a high proportion of the disk system bandwidth and allocating residual disk bandwidth after guaranteed requests to non-guaranteed requests in a manner consistent with their priorities.

Guaranteed requests from continuous stream requesters are placed into an earliest deadline ordered queue 410 in the appropriate disk scheduler. Non-guaranteed rate request are placed into a separate highest priority ordered queue 708. In addition to request from available rate clients 752 and guaranteed rate clients 754, requests may also come from the file system itself. Some requests from the file system may be time critical such as request for blocks that contain pointers to future stream blocks. Deadlines are associated with these requests and they are inserted in the appropriate deadline queue 410. Other requests, such as non-time critical file management requests, are assigned a priority and inserted in the appropriate priority queue 708. The file system requests may be buffered in a meta pool 702. Available rate client request may be buffered in a data pool 704.

Requests are migrated from the deadline and priority queues by a bandwidth allocator 710, according to a cycle which allocates bandwidth according to a configurable allocation. For example, 90 percent of a particular storage system's bandwidth may be assigned to the deadline queue and thus guaranteed rate stream clients, and 10 percent assigned to the priority queue for available rate clients. The bandwidth allocator 710 may migrate requests from the deadline and priority queues to a seek reorder queue 750. Request may be reordered in the seek reorder queue according to the position of the requested data block on the storage device. The seek reorder queue may have a configurable maximum size. Requests from the deadline and priority queues are migrated to the seek reorder queue according to the current cycle slot whenever the seek reorder queue is not filled to its maximum size. Each migration is done from the queue indicated by the current slot of the cycle and then the cycle advances to the next slot. If the queue indicated by the slot is empty, then an entry from the alternate queue is chosen if it is non-empty. The migrated entry is reordered in the seek reorder queue such that all requests to one side of the entry refer to data blocks with storage addresses greater than or equal to its address and all entries on the other side of the queue request data blocks with disk addresses less than or equal to its address.

Each seek reorder queue 750 is concurrently traversed continuously in one direction (i.e., in increasing or decreasing disk addresses) until no further entries exist in the queue in that direction and it then reverses direction and resumes. Thus, the disk scheduler issues requests from the seek reorder queue to the storage system in order of disk addresses and advances to the next request when the previously issued request has been completed by the disk system.

Because the deadline and priority queues contain requests from many different streams and clients, the sequence of blocks resulting from these queues is essentially random. If these requests where serviced according to their order in the deadline and priority queues, excessive disk seek overhead would result from the random pattern of requests. The seek reorder queue 750 improves seek time by reordering request out of the deadline and priority queues according to their disk position.

Turning now to FIG. 11, a flow chart is provided illustrating operation of the seek reorder queue 750. As indicated at 1102, when the seek reorder queue is not full, a request is migrated from either the deadline or priority queue according to the current cycle slot. If the indicated queue is empty, the request is taken from the alternate queue if that queue is non-empty as indicated at 1104. The migrated request is inserted into the seek reorder queue according to the disk address of the requested block so that requests in the seek reorder queue are ordered by increasing or decreasing disk addresses. Simultaneously, the seek reorder queue is traversed in one direction and the next request is issued to the disk system as indicated at 1108. If the end of the seek reorder queue has been reached then the direction of queue traversal is reversed as indicated at 1110 and 1114. If the end of the seek reorder queue has not been reached, then the current traversal direction is maintained as indicated at 1110 and 1112. Once the current request has been satisfied by the disk system, the next request in the seek order queue is issued to the disk system as indicated at 1116 and 1108.

As noted earlier, block requests as viewed by the storage system are inherently random because the storage system is presented with requests from many streams. Given this randomness it would be inefficient to sequentially allocate blocks for a particular file. Because I/O cylinders of a disk often have different transfer rates, block allocation within a particular file bounces back and forth between I/O zones of the disk. Thus for any particular stream file, block storage request are assigned disk addresses so that the blocks will be located in alternating I/O zones of the disk. This ensures that all files see an average storage throughput and that no file being streamed could end up coming entirely from a low performance zone of the disk.

As mentioned above, the video storage manager must control admission of new continuous streams to ensure that the aggregate of the guaranteed stream rates does not exceed the aggregate storage bandwidth allocated for continuous media streams. Before any streaming is begun the storage systems are characterized to determine their performance or bandwidth. Once a storage system bandwidth has been determined, then when streaming begins, as each new stream is requested the video storage manager determines whether or not the requested bit rate would exceed the remaining available bandwidth allocated for continuous streams. If so, the request is denied and the requester is free to resubmit the request at a later time or with a lower bit rate request. If sufficient bandwidth exits the request is granted and a stream manager creates an associated buffer ring as discussed above.

Because a sequence of requests presented to the storage system while streaming is essentially random, modeling the stream load to characterize storage bandwidth may be simplified. This performance may be characterized with a synthetic load that reflects the characteristics of a typical load. The synthetic load may vary from a purely random sequence of blocks to take into account the fact that blocks for any given file may be placed in alternating I/O disk zones. Thus a representative load may be constructed by constraining the file system to allocate sequential blocks in a zoned random manner. The disk block address range may be divided into two halves and sequential file block allocations may be chosen from random positions within a zone alternating between the two zones. Disk performance may be characterized using this synthetic load and then de-rated to provide margin. The amount of de-rate may be referred to as the primary de-rate parameter. The de-rated bandwidth value is then multiplied by the fraction of the total bandwidth allocated in the cycle process for guaranteed rate requesters. The resulting guaranteed rate bandwidth may be de-rated again by a secondary de-rate parameter to allow for additional deadline safety margin. The result is the maximum admission bandwidth for the aggregate of all guaranteed rate requests. Guaranteed rate requesters can then be admitted until they have consumed the entire guaranteed rate admission bandwidth.

Figure 12:
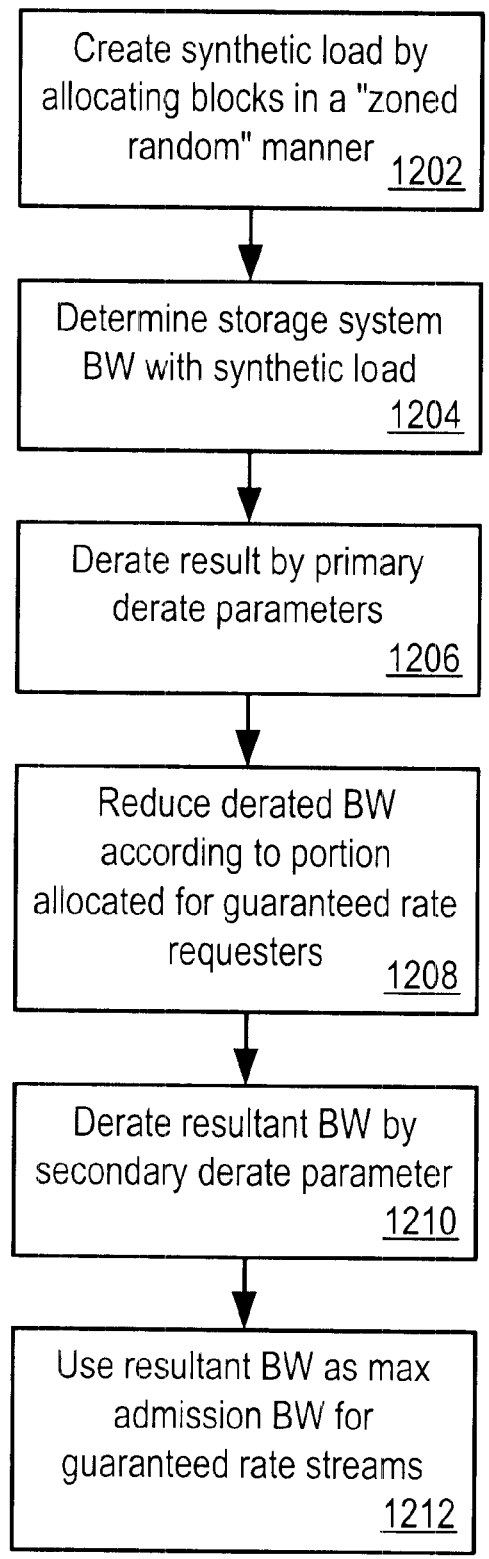
FIG. 12 is a flowchart illustrating storage characterization for admission control.

Storage characterization for admission control is summarized in FIG. 12. A synthetic load is created by allocating blocks in a zoned random manner so that sequential file block allocations are chosen from random positions within a zone alternating between an I/O disk zone as indicated 1202. Storage system bandwidth is determined using this synthetic load as indicated at 1204. The determined bandwidth is de-rated by a primary de-rate parameter to provide a certain margin as indicated at 1206. The de-rated bandwidth is reduced according to the portion of the bandwidth allocated for guaranteed rate request as indicated at 1208. This portioned bandwidth may then again be de-rated by a secondary de-rate parameter to provide extra deadline margin as indicated at 1210. The resultant bandwidth may then be used as a maximum aggregate admission bandwidth for guaranteed rate streams as indicated at 1212.

Figure 13:
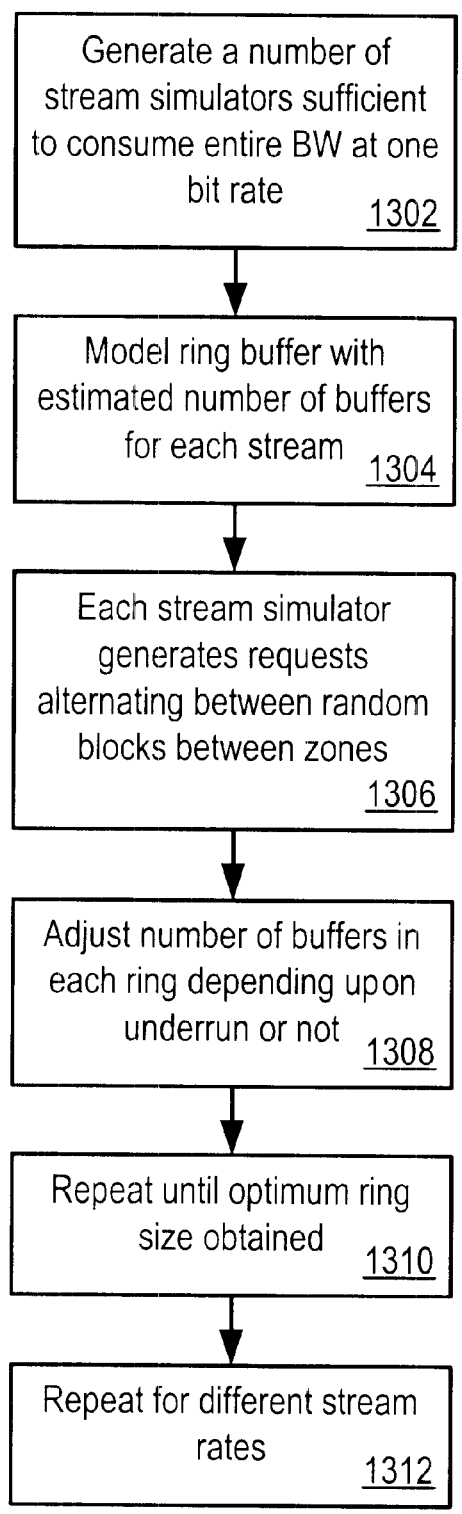
FIG. 13 is a flow chart illustrating determination of the optimum number of buffers for a buffer ring for a variety of stream rates.

The characterization process may also include determining appropriate buffer ring sizes for various stream rates across the storage system's desired operational range. The optimum number of buffers for a buffer ring may be determined for a variety of stream rates as follows. Referring to FIG. 13, for each particular stream rate, the characterization routine creates enough stream simulators to consume the entire aggregate throughput of the storage system as indicated at 1302. For each stream simulator, a ring buffer is modeled as indicated at 1304. Each stream simulator then generates block requests alternating between random blocks between zones as indicated at 1306. The simulated streams are then run until a completion of a test time or until any one of the streams suffers an underrun. An underrun occur when a buffer request is not completed before the request deadline. In a preferred embodiment, a prefill margin parameter may be set so that an underrun occurs if a buffer request is not completed within the prefill margin time before the request deadline. The number of ring buffers in the model may be adjusted and the simulation repeated as indicated at 1308 and 1310 until the correct ring buffer size is obtained. The entire simulation may then be repeated for a different stream rate as indicated at 1312. Thus a table of appropriate ring buffer sizes may be constructed during characterization for a variety of stream rates up to the maximum streams rates supported by the system. During operation whenever a new stream is admitted, an appropriately sized ring buffer may be created for the new stream by accessing this table.

The performance of the video storage manager may be tuned by adjusting a number of parameters as discussed above. These parameters are summarized in the following table.

TABLE 1

System Characterization Parameters

| Parameter | Comments |
| --- | --- |
| primaryDerate | Adjusts operational load level of storage systems relative to the maximum throughput. That is, adjusts service time (queue lengths) for storage system load at which buffer rings are sized. |
| available I/O rate | Specifies storage bandwidth reserved for metadata and available I/O. |
| secondary Derate | Reduces streaming bandwidth to allow for additional deadline safety margin. |
| prefill margin | Specifies deadline safety margin. Note - secondaryDerate obtains underrun protection at the cost of potential streaming bandwidth; prefill margin obtains underrun protection at the cost of additional buffer memory. |
| ioOverlap | Specifies the target number of I/O requests kept queued with the operating system in the see reorder buffer. ioOverlap trades off seek efficiency against service time variability. (Higher service time variability requires more memory for buffers.) |
| blockSize | Specifies block size. blockSize trades off seek amortization against buffer fragmentation at lower stream rates. |

These parameters may be used to configure and adjust the performance of a media storage system such as the system described above. The maximum sustainable throughput of the storage system may be characterized as described above, such as by using a synthetic load. In order to adjust the operation load level of the storage system relative to the maximum throughput, the characterized maximum sustainable throughput may be derated by the primary derate parameter. The primary derate parameter is configurable and may be set during system configuration. Queues, such as the deadline queues described above, may be sized based on the derated maximum throughput as derated by the primary derate factor. The resultant throughput may be called the primary throughput. This primary throughput may be used for sizing the buffer rings as described above. The primary derate parameter provides a safety margin for the operational load level of the storage system at the expense of lowering the available maximum throughput. By setting the primary derate parameter during system configuration, the user may adjust this trade off as needed for any particular application of the storage system.

The available I/O rate parameter specifies the storage bandwidth reserved for non-rate guaranteed requests, as discussed above in regard to the bandwidth allocator. The amount of bandwidth reserved for non-guaranteed-rate requests versus guaranteed rate requests may be configured using this parameter. Depending upon a system's needs, the user may adjust the proportioning between non-guaranteed and guaranteed rate requests by adjusting this available rate parameter.

The secondary derate parameter reduces bandwidth available for rate guaranteed streams. The primary throughput is proportioned according to the available rate parameter and the proportion allocated for rate guaranteed streams is further reduced by the secondary derate parameter to provide additional deadline safety margin. During operation additional streams may be admitted up to the point that the aggregate of all stream rates entirely consumes the portion of the primary throughput allocated to guaranteed rate streams as derated by the secondary derate parameter.

The prefill margin parameter specifies a deadline safety margin used during the calculation of buffer ring sizes. During system configuration buffer ring sizes may be calculated for various stream rates, such as described in regard to FIG. 13. The prefill margin parameter specifies a margin by which the deadlines must be met during this buffer ring size calculation process, e.g., the prefill margin provides a margin by which buffer underrun must be avoided when the buffer ring sizes are being determined. Note that the prefill margin parameter obtains additional underrun protection at the cost of additional memory used for larger ring buffers. A larger prefill margin will result in larger ring buffer sizes since, for certain stream rates, additional buffers will be required in the buffer ring to avoid missing the requests deadlines by the specified prefill margin. In contrast, the secondary derate parameter obtains additional underrun protection at the cost of potential bandwidth for rate guaranteed streams. Thus, the secondary derate parameter and prefill margin parameter provide a user of the storage system with the capability to adjust the system performance by making several different tradeoffs as is optimum for a particular application. For example, if plenty of memory is available, but additional bandwidth is needed, then the secondary derate may be lowered and the prefill margin increased. However, if memory is at a premium, the prefill margin may be decreased and the secondary derate parameter increased.

The I/O overlap parameter (also referred to as the seek reorder buffer length parameter) specifies the number of storage requests queued with the operating system for a storage unit. For example, in the system described above, a seek reorder queue is used to queue requests to the storage units in an order according to the physical disk address of the storage requests. The length of such a queue may be configured by the I/O overlap parameter. This parameter trades off seek efficiency against service time variability. For example, the larger the seek reorder queue is made, the more requests may be presented to the storage unit in a linear order thus increasing drive seek efficiency. However, since the requests are reordered from their deadline and priority orderings, a longer seek reorder queue length will increase the variability in meeting request deadlines. This parameter may be taken into account when sizing the buffer rings such that larger seek reorder queue sizes may result in larger buffer ring sizes to account for the variability in satisfying request deadlines. Therefore, the I/O overlap parameter may allow the user to trade off memory that must be made available for buffers versus higher drive seek efficiency.

In one embodiment the block size by which media data is accessed on the storage units may be configured according to a block size parameter. Configuring the block size may allow for trading off seek amortization against buffer fragmentation at lower stream rates. A larger block size may allow for greater seek efficiency, however, a larger block size may also result in more fragmentation and less efficient use of storage capacity for certain file sizes.

Figure 14:
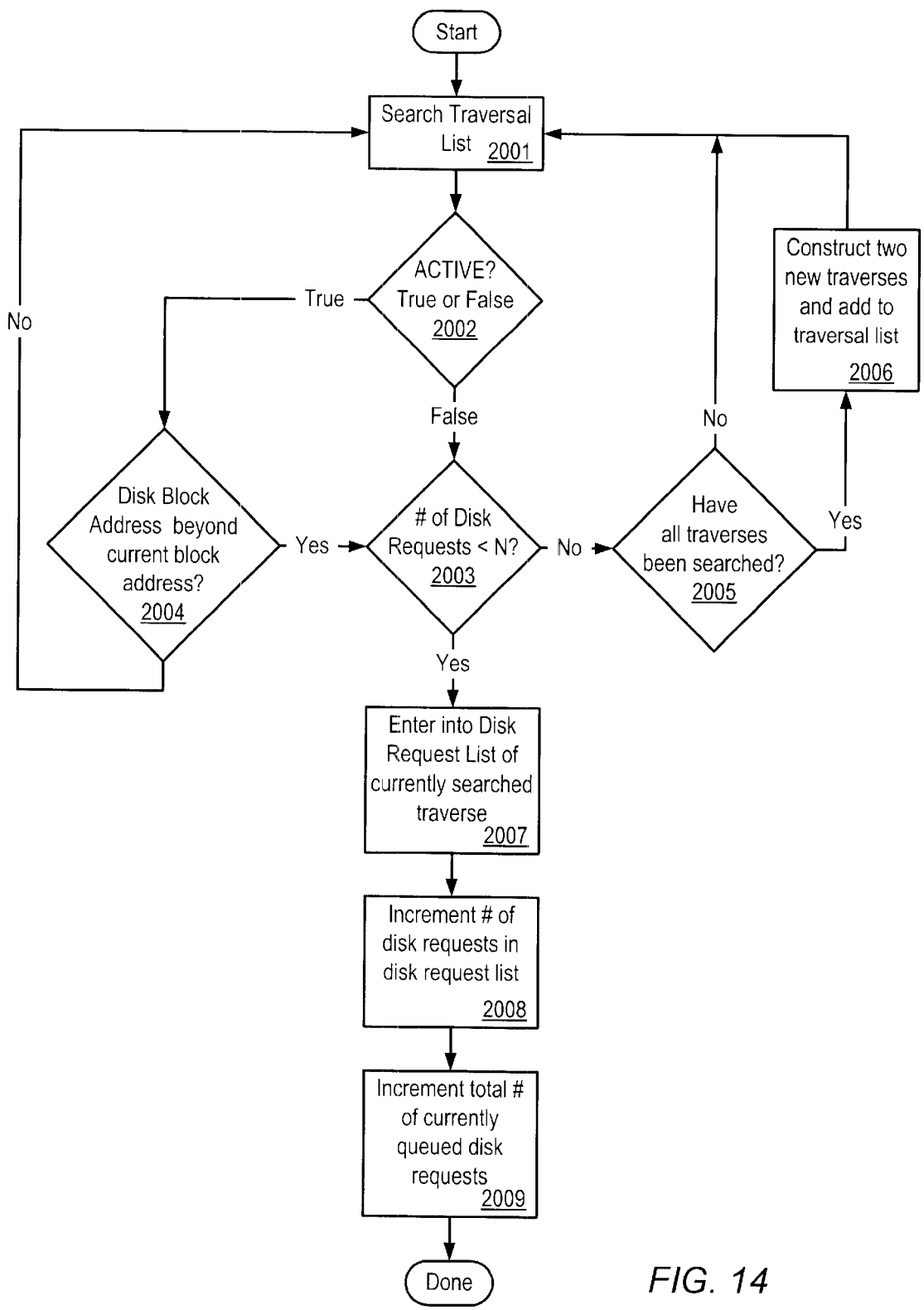
FIG. 14 is a flow chart illustrating a method of scheduling disk access requests in a traversal list for one embodiment.

Moving now to FIG. 14, a flow chart illustrating one embodiment of a method of scheduling disk access requests in a traversal list for one embodiment is shown. In order to schedule a disk access request, a suitable disk head traversal must be found. A search of the traversal list is initiated in step 2001. When searching a disk head traversal, a determination must be made as to whether the traversal being searched is active (Step 2002). If the traversal being searched is active, a comparison of the current disk block address (i.e. the current address of the disk head) is compared to the address of the disk request. The address of the disk request must be beyond the current disk block address with respect to the specified direction of the disk head traversal. This requirement may help minimize disk head motion, as it may prevent the disk head from having to change direction during a given traversal. If the address of the disk request is not beyond the current disk block address, then the search process must begin again at step 2001.

If the disk block address is beyond the address of the disk head (Step 2004), or the currently searched traversal is not active (active=false, Step 2002), the search algorithm then looks at the number of disk requests in the disk request list (Step 2003). Prior to beginning the search algorithm, a maximum number N of disk requests per disk head traversal is specified. By limiting the number of disk requests per disk head traversal, the response time for a given disk access request may be effectively bounded. This may allow for relatively uniform disk access times, which may be required for certain applications (particularly multimedia applications). Typical values of N are between 8 and 10 requests per traversal, although the value of N may be changed to suit various embodiments. Large values of N typically result in greater optimization of disk head motion, although disk access times may be less uniform. Conversely, smaller values of N may allow for more uniform disk access times, with less optimization of disk head motion.

If the number of disk requests in the currently searched traversal has reached the specified maximum value N, a new traversal must be searched. A determination is made to check if all traversals have been searched in Step 2005. If all disk head traversals on the traversal list have been searched without finding a suitable location for the disk access request, two new disk head traversals are constructed and appended to the end of the traversal list (Step 2006). The disk request list of each of the newly constructed disk head traversals is empty, and thus a subsequent search may easily find a suitable location for a disk request access. Various embodiments of the system constrain the number of disk head traversals to be even, with the direction of disk head motion alternating with each subsequent traversal. Thus, the first newly constructed traversal to be appended to the traversal list may specify a direction of head motion opposite of the previous disk head traversal. The second newly constructed traversal to be appended may specify a direction of disk head motion opposite that of the first newly constructed traversal. Following the appending of the two newly constructed traversals, searching resumes with Step 2001.

Once a suitable disk head traversal is found, the disk access request may then be entered into the traversal's disk request list (Step 2007). The disk request may be entered in a location on the list to allow disk head motion to continue in a single direction during the traversal. This may require re-arranging some of the disk accesses already entered into the disk request list. Following this, a variable indicating the number of disk requests in the disk request list is incremented (2008). Another variable indicating the total number of disk requests for all disk head traversals is also incremented (Step 2009).

Other embodiments using different methods of reordering the disk requests are possible and contemplated. For example, one alternate embodiment may maintain a single list of all disk requests. Each entry on the list corresponding to a disk request may include a variable indicating the number of subsequently arriving disk requests that have been re-ordered to be satisfied before the original disk request. This variable may have a maximum value that, once reached, may cause any further disk requests to be scheduled after the original disk request. Thus, the number of disk requests that may be reordered to be satisfied before an original disk request is limited, which may effectively bound the amount of time required to satisfy the original disk request.

Turning now to FIG. 15, an example of a traversal list which may be used for scheduling disk access requests using the method of FIG. 14 is shown. As illustrated here, traversal list 2500 includes entries corresponding to eight different disk head traversals. Each entry of list includes a traversal number, a disk request list, an active variable, a direction variable, and a variable indicating the number of disk requests for the corresponding disk head traversal. In the example shown, each disk request list may contain up to 10 disk requests (i.e. N=10). Each disk request entered into a disk request list includes a disk address. The disk address is the location on the disk where the disk head is to read the data in order to satisfy the request. In the example shown, the addresses of each entry are represented in a hexadecimal format. In general, addresses may be entered into the disk request list in any format suitable to the particular embodiment.

Each traversal entry also includes a direction variable. In the embodiment shown, the direction is either indicated as low-to-high (low addresses to high addresses) or high-to-low. As such, the disk requests entered into the disk request list are ordered in a manner consistent with the state of the direction variable for the given disk head traversal. In some cases, entry of a disk request into a disk request list may require reordering of the previously entered requests in order to maintain the direction specified by the state of the direction variable. For example, if a disk request for disk address 1A2F is to be entered in the third traversal in the list, it may be entered in the fourth position on the list. The disk request previously in the fourth position (disk address 1FA1) may be moved to the fifth position of the disk request list, thus maintaining the low-to-high direction specified for the traversal.

Each traversal also includes a Boolean variable to indicate whether the traversal is active. The traversal is considered active when disk requests are carried out from its associated disk request list. When active, the active variable is set to a true state. For the remaining traversals, the active variable remains in a false state until the system begins to satisfy disk requests from its associated disk request list.

The traversal list also includes a current disk block address, which indicates the current position of the disk head with respect to the disk. In the example shown, the current disk block address is 0110. This corresponds to the first disk access request of the first traversal on the list. The current disk block address may be used by the scheduling algorithm when attempting to schedule a disk request in an active traversal. For example, if attempting to schedule a disk access request in an active traversal with a specified direction of low-to-high, the disk request must be for a higher address than the current disk block address in this embodiment. If the address of the disk request does not meet this requirement, it may then be scheduled to a non-active traversal.

Figure 16:
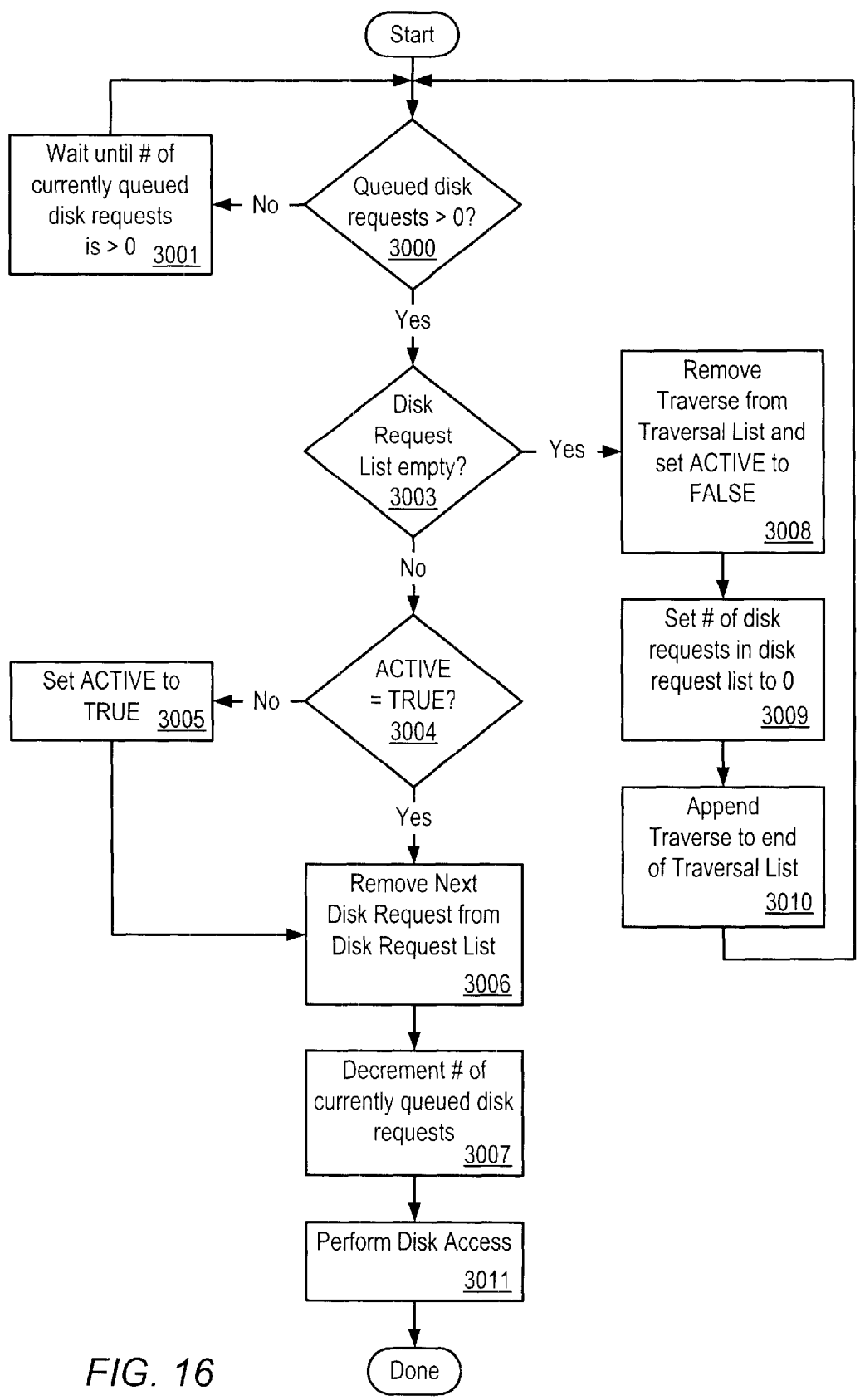
FIG. 16 is a flow chart illustrating one embodiment of a method of executing the disk access requests scheduled using the method in FIG. 14.

FIG. 16 is a flow chart illustrating a method of executing the disk access requests scheduled using the method in FIG. 14. Step 3000 begins with a check of the total number of all disk requests scheduled in the traversal list. If no disk requests are scheduled, the system enters a wait state (Step 3001), remaining idle until at least one disk request is scheduled. If the number of disk request lists is greater than zero, then the system will check the disk request list of the first entry of the traversal list (Step 3003). If the disk request list is empty (which may indicate that all disk requests of traversal have been performed), the entry corresponding to traversal is removed from the traversal list, and the active variable is set to false (Step 3008). Next, the variable indicating the number of disk requests on the traversal's disk request list is set to zero (Step 3009). Finally, the traversal is appended to the end of the traversal list (Step 3010).

If the check performed in Step 3003 indicates that the disk request list is not empty, a check is made to see if the active variable is true (Step 3004). Typically, if no disk requests have been performed for the current traversal, the active variable will be false, and thus must be set to true (Step 3005). With the active variable true, the next disk request is removed from the disk request list in preparation for performing the disk access (Step 3006). Following the removal of the disk request from disk request list, the variable indicating the total number of disk requests for all entries of the traversal list is decremented (Step 3007). Finally, in step 3011, a disk access is performed, thereby satisfying the disk access request.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A disk storage system comprising:
   a disk for storing data;
   a disk head for reading said data from said disk; and
   a scheduler for receiving a plurality of disk access requests, wherein said scheduler is configured to schedule disk access requests to a first traversal of said disk head, and, in response to determining that a total number of N requests have been scheduled to said first traversal, to schedule remaining disk access requests to one or more additional traversals of said disk head, and wherein the scheduler is configured to schedule each disk access request to one of a pair of disk head traversals, the disk head traversals of each pair having opposite directions of motion with respect to each other.

2. The disk storage system as recited in claim 1, wherein said disk storage system is configured to maintain a list of disk head traversals, said list including a plurality of entries.

3. The disk storage system as recited in claim 2, wherein each of said plurality of entries includes a disk request list, wherein said disk request list includes disk access requests for an associated disk head traversal.

4. The disk storage system as recited in claim 3, wherein each of said plurality of entries includes a variable for indicating a number of disk access requests in said disk request list.

5. The disk storage system as recited in claim 2, wherein each of said plurality of entries includes a Boolean variable for indicating whether an associated disk head traversal is active.

6. The disk storage system as recited in claim 5, wherein said Boolean variable is true when said associated disk head traversal is active.

7. The disk storage system as recited in claim 2, wherein each of said plurality of entries includes a variable indicating a direction of motion for said disk head for an associated disk head traversal.

8. The disk storage system as recited in claim 7, wherein the direction of motion of said first traversal of said disk head is in a direction opposite the direction of motion for a second traversal of said disk head, wherein said second traversal of said disk head immediately follows said first traversal of said disk head.

9. The disk storage system as recited in claim 1, wherein said disk storage system is configured to maintain a variable indicating an address of said disk head.

10. A method of scheduling disk access requests in a disk storage system, the disk storage system including a disk for storing data and a disk head for reading data, the method comprising:

scheduling a plurality of disk access requests to a first traversal of said disk head; and scheduling remaining disk access requests to one or more additional traversals of said disk head in response to determining that a total number of N requests have been scheduled to said first traversal of said disk head, and wherein said scheduling includes assigning each disk access request to one of a pair of disk head traversals, the disk head traversals of each pair having opposite directions of motion with respect to each other.

11. The method as recited in claim 10 further comprising maintaining a list of disk access requests scheduled for execution during a traversal of said disk head.

12. The method as recited in claim 11, wherein said method includes determining if said first traversal is active.

13. The method as recited in claim 12, wherein said method includes determining a current address of said disk head.

14. The method as recited in claim 13, wherein a variable is maintained indicating the total number of disk access requests for all of said plurality of entries of said traversal list.

15. The method as recited in claim 11, wherein said method includes maintaining a traversal list, said traversal list including a plurality of entries corresponding to said disk head traversals.

16. The method as recited in claim 15, wherein each of said plurality of entries includes a Boolean variable for indicating if a corresponding disk head traversal is active.

17. The method as recited in claim 16, wherein said Boolean variable is true when corresponding disk head traversal is active.

18. The method as recited in claim 15, wherein each of said plurality of entries includes a variable for indicating a direction of disk head motion during a corresponding disk head traversal.

19. The method as recited in claim 18, wherein the direction of disk head motion of a second traversal is opposite of the direction of disk head motion of said first disk head traversal, wherein said second disk head traversal immediately follows said first disk head traversal.

20. The method as recited in claim 15 further comprising the scheduling of two new disk head traversals if a suitable disk head traversal is not found for a disk access request, wherein said two new disk head traversals are appended to the end of said traversal list.

21. A disk storage system comprising:

a disk for storing data;

a disk head for reading said data from said disk; and a traversal list including a plurality of entries, wherein each of said entries includes a list of disk requests for a traversal of said disk head, wherein said list of disk requests may include up to N disk access requests, wherein each disk request is assigned to one of a pair of disk head traversals, the disk head traversals of each pair having opposite directions of motion with respect to each other.

22. The disk storage system as recited in claim 21, wherein each of said plurality of entries includes a variable to indicate the direction of motion of said disk head during a traversal of said disk head.

23. The disk storage system as recited in claim 22, wherein said traversal list includes entries corresponding to a first traversal and a second traversal, wherein said first traversal has a direction of motion opposite of said second traversal, and wherein said second traversal immediately follows said first traversal.

24. The disk storage system as recited in claim 21, wherein each of said plurality of entries includes a Boolean variable for indicating whether a traversal is active and a variable indicating a number of disk requests in said list of disk requests.

25. A method of scheduling disk access requests in a disk storage system, said disk storage system including a disk head for reading data from a disk, the method comprising:

maintaining a list of disk access requests scheduled for execution during a traversal of said disk head;

determining from said list whether a number of disk access requests schedule for a first traversal of said disk head has reached a maximum number (N); and scheduling said additional disk access requests to additional traversals in response to determining said number of disk requests scheduled for said first traversal has reached said maximum number (N), wherein the additional traversals are grouped in pairs, wherein traversals of each pair have an opposite direction of motion with respect to each other.

26. The method as recited in claim 25, wherein said method includes reading a Boolean variable to determine if said first traversal is active.

27. The method as recited in claim 26, wherein said method includes determining the address of said disk head in response to determining that said first traversal is active.

28. The method as recited in claim 25, wherein a list of traversals is maintained, said list of traversals including a plurality of entries corresponding to traversals of said disk head.

29. The method as recited in claim 28, wherein each of said plurality of entries includes a variable for indicating the direction of motion of a corresponding disk head traversal.

30. The method as recited in claim 29, wherein a direction of motion for said first traversal is opposite of the direction of motion for a second traversal, and wherein said second traversal occurs immediately after said first traversal.

* * * * *